(12) United States Patent
Chen

(10) Patent No.: US 9,904,504 B2
(45) Date of Patent: Feb. 27, 2018

(54) SYSTEMS AND METHODS FOR PROVIDING ENVIRONMENTAL FEEDBACK BASED ON RECEIVED GESTURAL INPUT

(71) Applicant: Toyota Motor Engineering & Manufacturing North America, Inc., Erlanger, KY (US)

(72) Inventor: Tiffany L. Chen, Santa Clara, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 117 days.

(21) Appl. No.: 14/629,803

(22) Filed: Feb. 24, 2015

(65) Prior Publication Data

US 2016/0246562 A1    Aug. 25, 2016

(51) Int. Cl.
*G06F 3/041*  (2006.01)
*G06F 3/16*   (2006.01)
(Continued)

(52) U.S. Cl.
CPC ............... *G06F 3/16* (2013.01); *G06F 3/005* (2013.01); *G06F 3/016* (2013.01);
(Continued)

(58) Field of Classification Search
CPC ...... G06F 3/16; G06F 3/0304; G06F 3/04883; G09B 21/007
See application file for complete search history.

(56) References Cited

U.S. PATENT DOCUMENTS 5,807,111 A * 9/1998 Schrader .................. A61F 9/08
                                                   367/116
6,055,048 A * 4/2000 Langevin ............... A61H 3/061
                                                   356/237.1
(Continued)

FOREIGN PATENT DOCUMENTS

WO    2013067539    5/2013

OTHER PUBLICATIONS

Shaun K. Kane, Meredith Ringel Morris, Annuska Z. Perkins, Daniel Wigdor, Richard E. Ladner, Jacob O. Wobbrock; Access overlays improving non visual access to large touch screens for blind users; http://research.microsoft.com/pubs/155372/access_overlays.pdf.

*Primary Examiner* — Benyam Ketema
(74) *Attorney, Agent, or Firm* — Dinsmore & Shohl LLP

(57) ABSTRACT

A system for providing environmental feedback including one or more processors and a tactile input hardware. The tactile input hardware is communicatively coupled to the one or more processors. The system further includes one or more memory modules communicatively coupled to the one or more processors, one or more sensing devices communicatively coupled to the one or more processors, and machine readable instructions stored in the one or more memory modules that, when executed by the one or more processors, causes the one or more processors to receive environmental information from the one or more sensing devices, receive a gestural input on the tactile input hardware, and generate feedback regarding a subset of the environmental information acquired by the one or more sensing devices in response to the gestural input received on the tactile input hardware.

19 Claims, 4 Drawing Sheets

(51) Int. Cl.
*G06F 3/0488* (2013.01)
*G09B 21/00* (2006.01)
*G06F 3/00* (2006.01)
*G06F 3/01* (2006.01)

(52) U.S. Cl.
CPC ....... *G06F 3/04883* (2013.01); *G09B 21/007* (2013.01); *G06F 2203/014* (2013.01)

(56) References Cited

U.S. PATENT DOCUMENTS

| | | | | |
|---|---|---|---|---|
| 6,452,544 | B1* | 9/2002 | Hakala | G01C 21/20 342/357.31 |
| 7,536,034 | B2 | 5/2009 | Rhoads et al. | |
| 8,588,464 | B2 | 11/2013 | Albertson et al. | |
| 8,605,141 | B2 | 12/2013 | Dialameh et al. | |
| 8,737,986 | B2 | 5/2014 | Rhoads et al. | |
| 8,891,817 | B2 | 11/2014 | Wexler et al. | |
| 9,201,143 | B2* | 12/2015 | Slamka | G01S 19/14 |
| 9,256,281 | B2* | 2/2016 | Ur | G06F 3/01 |
| 2003/0133008 | A1* | 7/2003 | Stephenson | H04N 5/2251 348/47 |
| 2005/0099306 | A1* | 5/2005 | Gilfix | A61H 3/061 340/573.1 |
| 2007/0041600 | A1* | 2/2007 | Zachman | A61F 11/04 381/312 |
| 2012/0075341 | A1* | 3/2012 | Sandberg | G06F 17/30855 345/633 |
| 2013/0194402 | A1* | 8/2013 | Amedi | A61H 3/061 348/62 |
| 2013/0218456 | A1* | 8/2013 | Zelek | G01C 21/3652 701/412 |
| 2014/0142851 | A1* | 5/2014 | Larmo | G01C 21/3652 701/538 |
| 2014/0184384 | A1* | 7/2014 | Zhu | G09B 21/003 340/4.12 |
| 2015/0063610 | A1* | 3/2015 | Mossner | H04S 5/005 381/307 |
| 2015/0112237 | A1* | 4/2015 | Amedi | G09B 21/00 601/47 |
| 2015/0125831 | A1* | 5/2015 | Chandrashekhar Nair | G09B 21/004 434/114 |
| 2015/0198454 | A1* | 7/2015 | Moore | G06F 3/167 701/428 |
| 2015/0198455 | A1* | 7/2015 | Chen | G01C 21/3629 701/428 |
| 2015/0253848 | A1* | 9/2015 | Heubel | G06F 3/016 345/173 |
| 2015/0294597 | A1* | 10/2015 | Rizzo | A61H 3/04 340/4.12 |
| 2016/0019817 | A1* | 1/2016 | Deokar | G08B 6/00 340/4.12 |
| 2016/0154240 | A1* | 6/2016 | Lee | G02B 27/0093 345/8 |

* cited by examiner

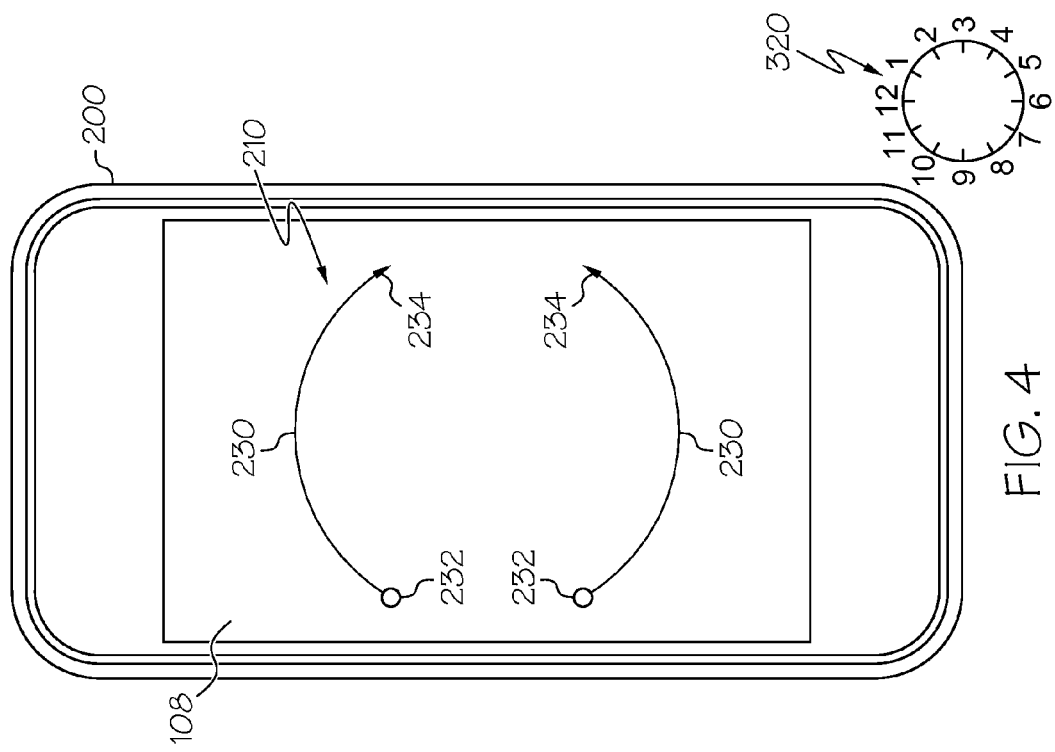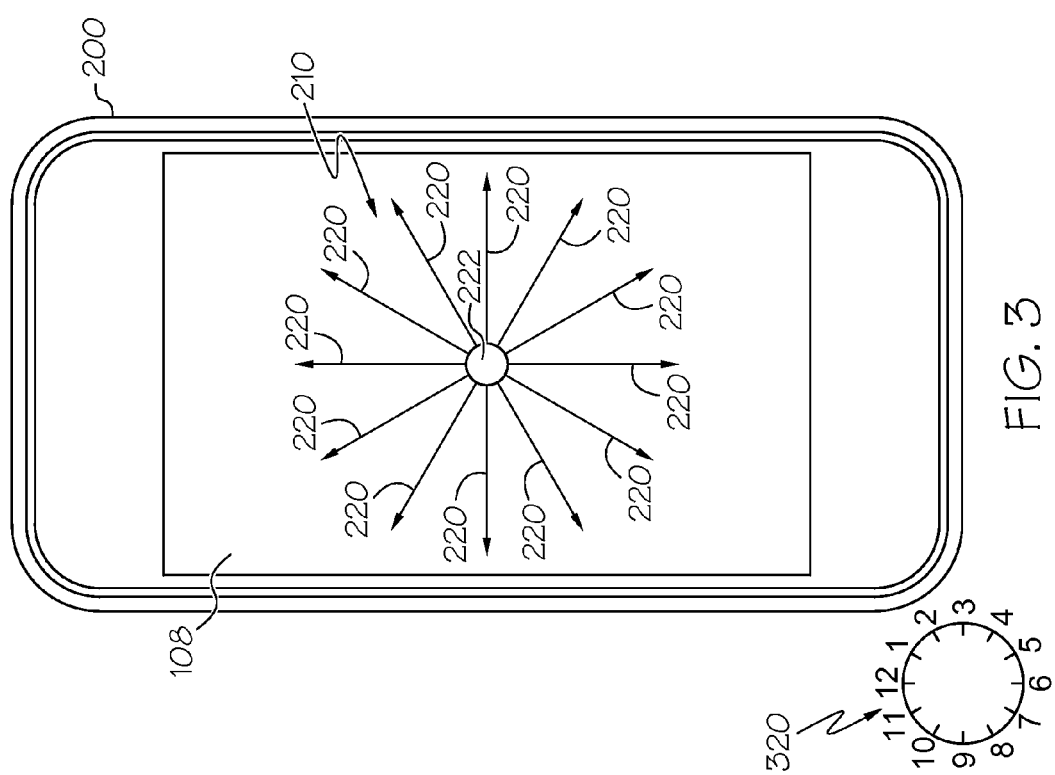
FIG. 3
FIG. 4

SYSTEMS AND METHODS FOR PROVIDING ENVIRONMENTAL FEEDBACK BASED ON RECEIVED GESTURAL INPUT

TECHNICAL FIELD

Embodiments described herein generally relate to systems and methods for assisting blind or visually impaired persons and, more specifically, to systems and methods for providing environmental feedback to a blind or visually impaired user in response to receiving gestural input.

BACKGROUND

Blind or visually impaired persons have difficulty navigating within their environment because of their inability to detect the location and type of objects within the environment. Blind or visually impaired persons often use a cane to assist them in navigating a space. However, the cane and other traditional navigation methods and mechanisms do not provide detailed information regarding the environment surrounding user upon request by the user.

Accordingly, a need exists for vision-assist devices for blind or visually impaired persons that provide information regarding the environment surrounding the user upon request by the user.

SUMMARY

In one embodiment, system for providing environmental feedback includes one or more processors and a tactile input hardware. The tactile input hardware is communicatively coupled to the one or more processors. The system further includes one or more memory modules communicatively coupled to the one or more processors, one or more sensing devices communicatively coupled to the one or more processors, and machine readable instructions stored in the one or more memory modules that, when executed by the one or more processors, causes the one or more processors to receive environmental information from the one or more sensing devices, receive a gestural input on the tactile input hardware, and generate feedback regarding a subset of the environmental information acquired by the one or more sensing devices in response to the gestural input received on the tactile input hardware.

In another embodiment, a system for providing environmental feedback includes a mobile device having tactile input hardware and an auxiliary sensing apparatus including one or more sensing devices. The mobile device is configured to receive a gestural input on the tactile input hardware of the mobile device. The gestural input includes a gestural pathway along a surface of the tactile input hardware. The gestural pathway corresponds with a clock face direction. The wearable auxiliary sensing apparatus is configured to receive environmental information regarding one or more points of interest within an environment disposed in the clock face direction of the gestural pathway. At least one of the wearable auxiliary sensing apparatus and the mobile device are configured to provide feedback regarding the one or more points of interest within the environment disposed in the clock face direction of the gestural pathway in response to the gestural input received on the tactile input hardware of the mobile device.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 3 schematically depicts the gestural pathways comprising rays positioned on a mobile device, according to one or more embodiments shown and described herein;

FIG. 4 schematically depicts the gestural pathways comprising sweeping pathways positioned on a mobile device, according to one or more embodiments shown and described herein;

DETAILED DESCRIPTION

The embodiments disclosed herein include systems and methods for providing environmental feedback to a user, for example, a blind user, regarding one or more points of interests located in an environment surrounding the user based on a received tactile input. The systems and methods also allow the user to request information regarding points of interest positioned in a particular clock face direction with respect to the components of the environmental feedback system and/or the user. For example, the system may receive a gestural input from the user corresponding with a particular clock face direction and in response the system may provide the user with feedback regarding one or more points of interest positioned in the environment in that particular clock face direction. Further, the systems and methods allow the user to request varying levels of detail regarding the points of interest positioned in the surrounding environment. The various systems and methods for providing environmental information based on receipt of a gestural input will be described in more detail herein with specific reference to the corresponding drawings.

Figure 1:
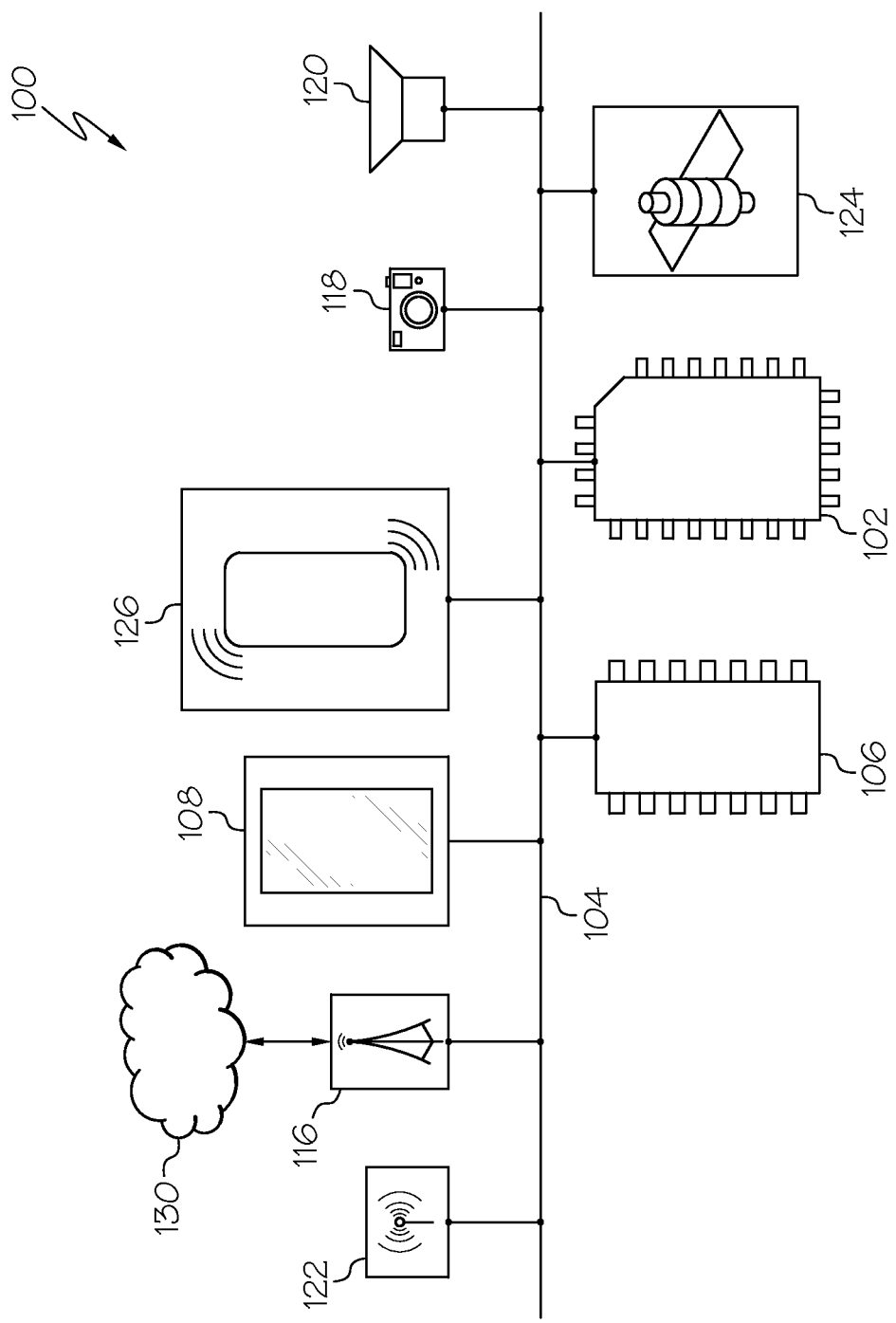
FIG. 1 schematically depicts an environmental feedback system including a variety of sensors and electronic components, according to one or more embodiments shown and described herein.

Referring now to FIG. 1, an environmental feedback system 100 is depicted that includes one or more processors 102. Each of the one or more processors 102 may be any device capable of executing machine readable instructions. Accordingly, each of the one or more processors 102 may be a controller, an integrated circuit, a microchip, a computer, or any other computing device. The one or more processors 102 are coupled to a communication path 104 that provides signal interconnectivity between various components of the environmental feedback system 100. Accordingly, the communication path 104 may communicatively couple any number of processors 102 with one another, and allow the modules coupled to the communication path 104 to operate in a distributed computing environment. Specifically, each of the components may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The environmental feedback system 100 includes one or more memory modules 106 coupled to the communication path 104. The one or more memory modules 106 may comprise RAM, ROM, flash memories, hard drives, or any device capable of storing machine readable instructions such that the machine readable instructions can be accessed by the one or more processors 102. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more memory modules 106 may include a database that includes navigation information and/or map information. However, it should be understood that other embodiments may not include navigation information and/or map information.

Figure 2:
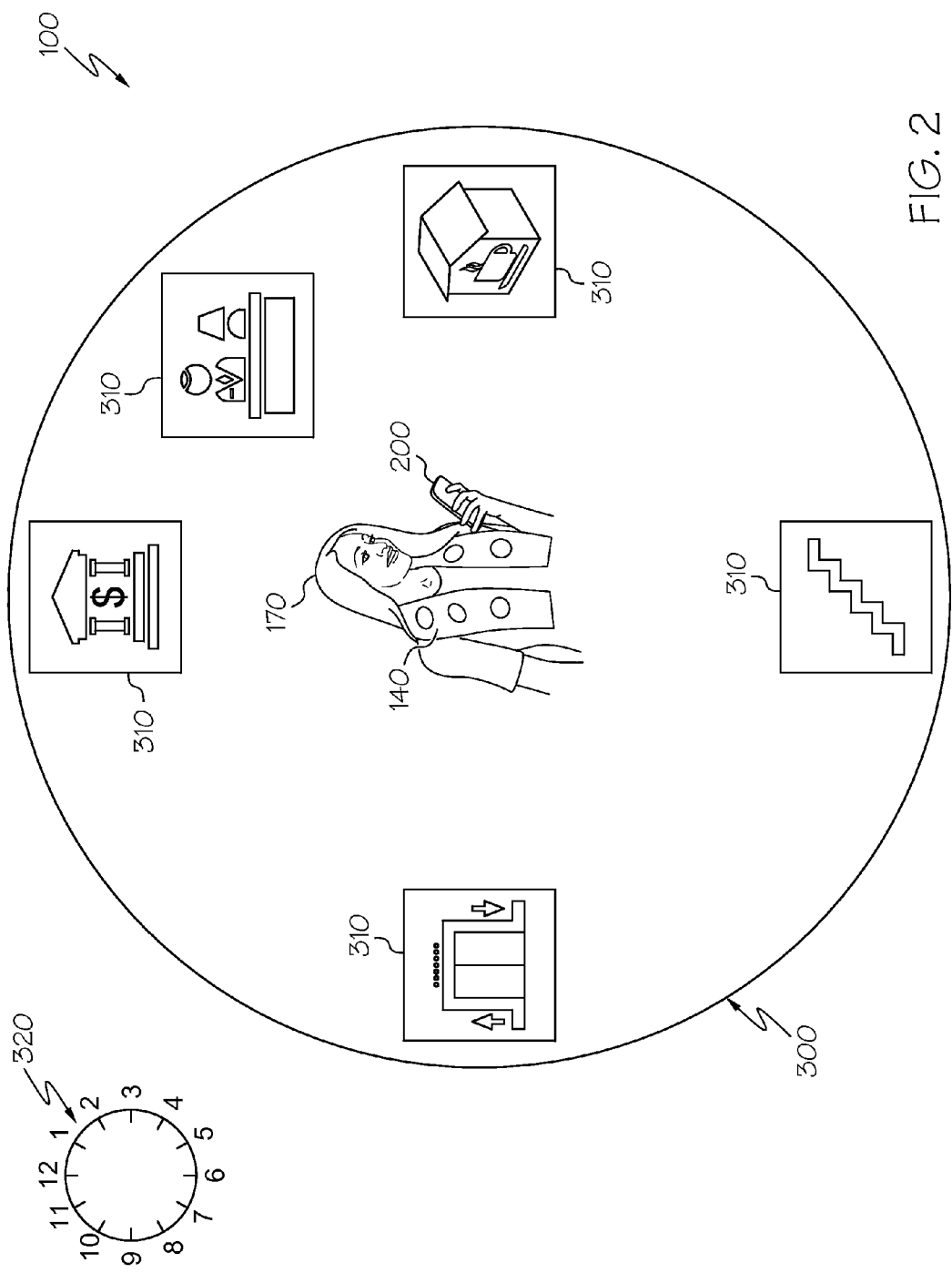
FIG. 2 schematically depicts the environmental feedback system positioned within an environment, according to one or more embodiments shown and described herein.

Referring still to FIG. 1, the environmental feedback system 100 comprises a display 108 for providing visual output such as, for example, the display 108 of a mobile device 200 and or a display 108 positioned on the auxiliary sensing device 140 (FIG. 2). The display 108 may include any medium capable of transmitting an optical output such as, for example, a cathode ray tube, light emitting diodes, a liquid crystal display, a plasma display, or the like. Moreover, the display 108 comprises tactile input hardware, for example, a touchscreen (e.g., a touchscreen comprising an array of capacitive touch sensors) that, in addition to providing optical information, detects the presence, location, and path of a tactile input upon a surface of or adjacent to the display 108. For example, the tactile input detected by the touchscreen may comprise a variety of gestures. The shape, path, and speed of the tactile input may be indicative of the variety of gestures and gestural pathways 210 (FIGS. 3-6). Further, the gestures and gestural pathways 210 (FIGS. 3-6) may comprise a request for environmental feedback, as described in greater detail below. Additionally, it is noted that the display 108 can include at least one of the one or more processors 102 and the one or memory modules 106.

In some embodiments, the environmental feedback system 100 may further include a network 130. In one embodiment, the network 130 is a personal area network that utilizes Bluetooth technology. In other embodiments, the network 130 may include one or more computer networks (e.g., a personal area network, a local area network, or a wide area network), cellular networks, satellite networks and/or a global positioning system and combinations thereof. Accordingly, the environmental feedback system 100 can be communicatively coupled to the network 130 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Additionally, the network 130 may be used to communicatively couple the components of the environmental feedback system 100 to the auxiliary sensing apparatus 140 (FIG. 2) and/or the mobile device 200 (FIG. 2).

Still referring to FIG. 1, the environmental feedback system 100 comprises network interface hardware 116. The network interface hardware 116 can be communicatively coupled to the communication path 104 and can be any device capable of transmitting and/or receiving data via a network. Accordingly, the network interface hardware 116 may include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 116 includes hardware configured to operate in accordance with the Bluetooth wireless communication protocol. In another embodiment, network interface hardware 116 may include a Bluetooth send/receive module for sending and receiving Bluetooth communications to/from the mobile device 200. Some embodiments may not include the network interface hardware 116. Additionally, network interface hardware 116 may be used to communicatively couple the components of the environmental feedback system 100 to the auxiliary sensing apparatus 140 (FIG. 2) and/or the mobile device 200 (FIG. 2).

The environmental feedback system 100 may further comprise a camera 118 coupled to the communication path 104 such that the communication path 104 communicatively couples the camera 118 to other modules of the environmental feedback system 100, as depicted in FIG. 1. The camera 118 may be any device having an array of sensing devices (e.g., pixels) capable of detecting radiation in an ultraviolet wavelength band, a visible light wavelength band, or an infrared wavelength band. The camera 118 may have any resolution. Some embodiments may include multiple cameras 118. In operation, the camera 118 may be able to detect the presence of points of interest 310, and the like, of the environment 300 (FIG. 2) surrounding the camera 118. In some embodiments, the camera 118 may be able to determine the location of environmental feedback system 100, for example, by accessing geotagged data. Further, in some embodiments, the camera 118 may be able to determine one or more characteristics of one or more points of interest 310 (FIG. 2) proximate the user 170, for example, descriptive and/or navigational information regarding the one or more points of interest 310.

Still referring to FIG. 1, the environmental feedback system 100 may further comprise one or more auditory devices 120 coupled to the communication path 104 such that the communication path 104 communicatively couples the one or more auditory devices 120 to other modules of the environmental feedback system 100. For example, the one or more auditory devices 120 may be embedded within the mobile device 200. The one or more auditory devices 120 transform data signals from the environmental feedback system 100 into audible mechanical vibrations. However, it should be understood that in other embodiments the environmental feedback system 100 may not include the one or more auditory devices 120. In some embodiments, the one or more auditory devices 120 may be configured to provide audible information regarding the environment 300, such as, for example, an alarm, a vocal message, or the like. In some embodiments, the one or more auditory devices 120 may be configured as speakers capable of receiving auditory signals from the processor 102 (either directly or indirectly from other hardware, such as amplifiers, drivers, digital-to-analog converts, and the like) to produce auditory message capable of being heard by the user 170. In some embodiments, the one or more auditory devices 120 include a first speaker and a second speaker so that the auditory message is provided to the user 170 in stereo. In some embodiments, the one or more auditory devices 120 may comprise headphones, earbuds, or the like.

Still referring to FIG. 1, the environmental feedback system 100 may further comprise one or more proximity sensors 122 coupled to the communication path 104 such that the communication path 104 communicatively couples the proximity sensors 122 to other modules of the environmental feedback system 100. The proximity sensor 122 may be any device capable of outputting a proximity signal indicative of a proximity of an object positioned within the environment 300 to the proximity sensor 122, for example, a point of interest 310 (FIG. 2). In some embodiments, the proximity sensor 122 may include a laser scanner, a capacitive displacement sensor, a Doppler effect sensor, an eddy-current sensor, an ultrasonic sensor, a magnetic sensor, an optical sensor, a radar sensor, a sonar sensor, or the like. Some embodiments may not include the proximity sensor 122. In some embodiments, the environmental feedback system 100 may be configured to determine the presence of points of interest 310 positioned within the environment 300 based on an output signal outputted by the proximity sensor 122.

The environmental feedback system 100 may further comprise one or more location sensors 124 coupled to the communication path 104 and communicatively coupled to the one or more processors 102. Each of the one or more location sensors 124 may be any device capable of generating an output indicative of a location. In some embodiments, the one or more location sensors 124 include a global positioning system (GPS) sensor, though embodiments are not limited thereto. Some embodiments may not include the one or more location sensors 124, such as embodiments in which the environmental feedback system 100 does not determine a location of the environmental feedback system 100 or embodiments in which the location is determined in other ways (e.g., based on information received from the one or more cameras 118, the network interface hardware 116, the one or more proximity sensors 112, or the like).

The environmental feedback system 100 may further comprise one or more tactile feedback devices 126 coupled to the communication path 104 and communicatively coupled to the one or more processors 102. Each of the one or more tactile feedback devices 126 may be any device capable of providing tactile feedback to the user 170. The one or more tactile feedback devices 126 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). Some embodiments may not include the one or more tactile feedback devices 126.

Further, while the components of the environmental feedback system 100 depicted in isolation in FIG. 1, some or all of the components of the environmental feedback system 100 may be embedded within a mobile device 200 (FIG. 2) such as a smartphone, tablet, watch, laptop computer, or the like. Further, components of the environmental feedback system 100 that are not embedded within the mobile device 200 may be in communication with the mobile device 200. Further, some or all of the components of the environmental feedback system 100 may be embedded in an auxiliary sensing apparatus 140 (FIG. 2) that is communicatively coupled with the mobile device 200 and/or any components of the environmental feedback system 100. It should be understood that the components of the environmental feedback system 100 may be fully or partially housed within the mobile device 200, the auxiliary sensing apparatus 140, or a location separate, while remaining communicatively coupled.

Referring now to FIGS. 1 and 2, a non-limiting, example auxiliary sensing apparatus 140 that is wearable by the user 170 is schematically depicted. In some embodiments, the auxiliary sensing apparatus 140 has a necklace configuration intended to be worn around the neck of the user 170 and may include portions extending downward from the neck and along the chest and/or the back of the user 170. Further, the auxiliary sensing apparatus 140 may include one or more sensing devices, such as proximity sensors 122 and cameras 118, configured to acquire environmental information regarding the environment 300 as well as points of interest 310 positioned in the environment 300. Further, the auxiliary sensing apparatus 140 may include one or more auditory devices 120 and one or more tactile feedback devices 126, configured to provide the user 170 with environmental feedback, for example, feedback regarding one or more points of interest 310 positioned in the environment 300. In alternative embodiments, the auxiliary sensing apparatus 140 is configured as eyeglasses. In this embodiment, the eyeglasses include forward-facing, rearward facing, and/or sideward-facing sensing devices, such as cameras 118, proximity sensors 122, or the like, configured to acquire environmental information regarding one or more points of interest 310 positioned in the environment 300 It should be understood that the auxiliary sensing apparatus 140 may be configured differently than what is illustrated in FIGS. 1 and 2, and that the auxiliary sensing apparatus 140 may take on different shapes and sizes in other embodiments.

Referring now to FIG. 2, the environmental feedback system 100 is schematically depicted within an environment 300. The environment 300 may be an indoor environment or an outdoor environment and may include one or more points of interest 310 representative of one or more locations or features present in the environment 300. In some embodiments, the environment 300 may be an indoor facility, for example, a mall, or the like, and the points of interest 310 may be various locations within the indoor facility. In the non-limiting example depicted in FIG. 2, the points of interest 310 represent a bank, an information desk, a coffee shop, a set of stairs, and an elevator bank. It should be understood that FIG. 2 depicts one example environment 300 and the points of interest 310 referenced herein may be any location, structure, and the like positioned within the environment 300. Additionally, in some embodiments, the environment 300 may comprise an outdoor environment and the one or more points of interest 310 may comprise outdoor structures, such as buildings, roads, or the like, and outdoor environmental features, such as hills, rivers, or the like.

Referring again to FIGS. 1 and 2, a method of providing feedback pertaining to one or more points of interest 310 of the environment 300 is contemplated. The method of providing feedback pertaining to the points of interest 310 may be implemented as logic within the machine readable instructions that, when executed by the one or more processors 102, provides feedback in response to gestural input received by the mobile device 200. It is noted that, while the method is described as following a specific sequence, additional embodiments of the present disclosure are not limited to any particular sequence. For example, while the embodiments described herein follow a sequence of acquiring environmental information regarding the points of interest 310 before receiving gestural input, in some embodiments, the environmental feedback system 100 acquires environmental information regarding the points of interest 310 after receiving gestural input.

Referring still to FIGS. 1 and 2, the environmental feedback system 100 may first determine a location of the user 170, the mobile device 200, and/or the auxiliary sensing apparatus 140. In operation, the location sensors 124 may receive a satellite signal from one or more global positioning satellites, for example, with a conductive element. Next, the one or more processors 102 execute machine readable instructions to transform the satellite signals received by the location sensors 124 into a data signal indicative of a location of the environmental feedback system 100 (e.g., the current location at the time the satellite signal is received). Further, alternative methods of determining the location of the user 170, the mobile device 200, and/or the auxiliary sensing apparatus 140 are contemplated, for example, based on an output from the proximity sensor 122 and/or the camera 118 pertaining to the distance between the mobile device 200 and/or the auxiliary sensing apparatus 140 and one or more points of interest 310. Additionally, the location of the points of interest 310 may be stored in the one or more memory modules 106 and/or the environmental feedback system 100 may be able to access these locations, for example, through communication with one or more outside networks, servers, or the like.

The environmental feedback system 100 may next acquire environmental information regarding all or a subset of the surrounding environment, for example, one or more points of interest 310. The environmental feedback system 100 may acquire this environmental information using one or more sensing devices of the auxiliary sensing apparatus 140 and/or the mobile device 200, for example, cameras 118, proximity sensors 122, or the like. In some embodiments, the environmental feedback system 100 may acquire environmental information in response to gestural input received by the mobile device 200, as described below (FIGS. 3-6). In some embodiments, the environmental feedback system 100 may continuously acquire information regarding the points of interest 310 located proximate the user 170. In other embodiments, the environmental feedback system 100 may access environmental information by communicating with one or more outside networks, servers, or the like. In each of these embodiments, the environmental feedback system 100 may store this acquired information, for example, within the memory modules 106 and may access this stored environmental information upon receipt of gestural input by the user 170.

Further, the environmental feedback system 100 may acquire environmental information regarding points of interest 310 located in a particular clock face direction from the user 170, the mobile device 200, and/or the auxiliary sensing apparatus 140. The clock face direction may be a relative direction of the points of interest 310 described using the analogy of a 12-hour clock lying flat in front of and/or below the user 170. A schematic clock 320 showing the clock face positions of a 12-hour clock is depicted in FIGS. 2-6 to provide reference coordinates. As depicted by the schematic clock 320, the 12-o'clock direction is directly ahead of the user 170, the 3-o'clock direction is to the right of the user 170, the 6-o'clock direction is directly behind the user 170, and the 9-o'clock direction is to the left of the user 170. It should be understood that each clock face direction (1-12) may be representative of that particular clock face direction with respect to the user 170, the mobile device 200, and/or the auxiliary sensing apparatus 140. Further, each clock face direction may correspond to a clock face position on the display 108 of the mobile device 200 corresponding to the radial positions of the schematic clock 320. Further, it should be understood that the clock face directions and clock face positions are described and referenced herein for ease of understanding and the environmental feedback system 100 may acquire and provide information corresponding to any direction from the user 170, not just discrete clock face directions.

Referring now to FIGS. 3-6, the environmental feedback system 100 may next receive a gestural input on the display 108 of the mobile device 200, having tactile input hardware, such as a touchscreen. The gestural input may comprise gestural pathways 210 corresponding to a request for information regarding a subset of the environment 300, for example, the one or more points of interest 310 positioned in the environment 300. In some embodiments, the gestural pathways 210 depicted in FIGS. 3-6 each represent a path of tactile input receivable by the mobile device 200, for example, tactile input between the user 170 and the display 108. In alternative embodiments, the gestural input may comprise non-contact input, for example, a gesture along one or more gestural pathways 210 within a threshold distance from the display 108. The threshold distance may comprise any distance, for example, 1 cm, 3 cm, 5 cm, 10 cm, or the like. In these embodiments, the non-contact gestural input may be detected by one or more sensing devices of the mobile devices 200, for example, cameras 118, proximity sensors 112, or the like, Referring now to FIG. 3, a plurality of gestural pathways 210 comprising one or more rays 220 positioned on the display 108 of the mobile device 200 are schematically depicted. In this embodiment, each ray 220 starts in a central location 222 on the display 108 and extends radially from the central location 222 such that each ray 220 extends along a clock-face direction on the display 108. Each ray 220 may comprise a vector pointing towards a location in the environment 300 surrounding the user 170, for example, one or more points of interest 310. In some embodiments, when the environmental feedback system 100 receives a gestural input along an individual ray 220 (e.g., a swipe), the gestural input comprises a request for feedback regarding the points of interest 310 positioned in the vector direction of the received ray 220. In some embodiments, received gestural input along the ray 220 may cause the environmental feedback system 100 to acquire information regarding the points of interest 310 located in the vector direction of the ray 220, and provide feedback including the acquired information. In other embodiments, the received gestural input may prompt the environmental feedback system 100 to access stored information regarding the points of interest 310 located in the vector direction of the ray 220, and provide feedback including this stored information. As a non-limiting example, in the environment 300 depicted in FIG. 2, a gestural input along the ray 220 in the 12 o'clock direction on the display 108 of the mobile device 200 comprises a request for feedback regarding the bank positioned in the 12 o'clock direction.

Referring now to FIG. 4, another plurality of gestural pathways 210 is schematically depicted on the display 108 of the mobile device 200. The illustrated plurality of gestural pathways 210 comprises one or more sweeping pathways 230 extending along an arc between a starting point 232 and a termination point 234. In some embodiments, the sweeping pathways 230 may traverse a plurality of clock face positions corresponding to a plurality of clock face directions. An individual sweeping pathway 230 may extend along an arc between a starting clock face position and a terminating clock face position, for example, between a starting clock face position comprising the 9-o'clock position and a terminating clock face position comprising the 3-o'clock position. In some embodiments, the sweeping pathway 230 may be a request for information regarding points of interest 310 in each clock face direction corresponding to each clock face position between and including the starting point 232 and the termination point 234 and may be a request for information regarding all points of interest 310 between and including the starting point 232 and the termination point 234. It should be understood that the sweeping pathway 230 may comprise an arc along any circumferential length of the display 108, for example from any first clock face position to any second clock face position. Additionally, it should be understood that the sweeping pathway 230 may extend in the clockwise direction or in the counterclockwise direction. As a non-limiting example, in the environment 300 depicted in FIG. 2, a gestural input along the sweeping pathway 230 from the 9 o'clock position to the 3 o'clock position in a clockwise direction on the display 108 of the mobile device 200 comprises a request for feedback regarding the elevator positioned in the 9-o'clock direction, the bank positioned in the 12 o'clock direction, the concierge positioned in the 1 o'clock direction, and the coffee shop positioned in the 3 o'clock direction.

Referring still to FIG. 4, in some embodiments, the sweeping pathway 230 may be a request for information regarding points of interest 310 in a vector direction of the sweeping pathway 230 at the termination point 234 of the sweeping pathway 230. For example, a sweeping pathway 230 extending in the clockwise direction along an arc terminating at the 12-o'clock position may comprise a request for information regarding points of interest 310 substantially to the right of the mobile device 200 (and/or the user 170) and a sweeping pathway 230 extending in the clockwise direction along an arc terminating at the 6-o'clock position may comprise a request for information regarding points of interest 310 substantially to the left of the mobile device 200 (and/or the user 170). It should be understood that in this embodiment, the sweeping pathway 230 may be used to request information regarding points of interest 310 positioned in any direction. As a non-limiting example, in the environment 300 depicted in FIG. 2, a gestural input along the sweeping pathway 230 from the 9 o'clock position to the 3 o'clock position in a clockwise direction on the display 108 of the mobile device 200 comprises a request for feedback regarding the stairs positioned in the 6-o'clock direction.

Figure 5:
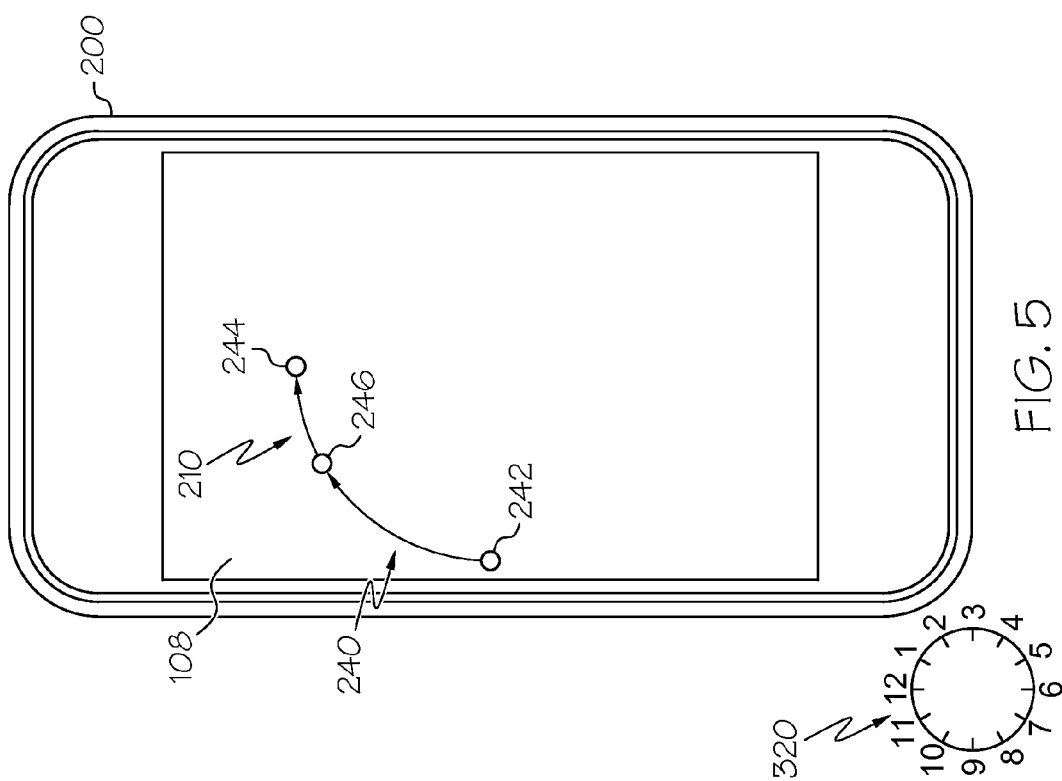
FIG. 5 schematically depicts the gestural pathways comprising iterative arcs positioned on a mobile device, according to one or more embodiments shown and described herein.

Referring now to FIG. 5, another plurality of gestural pathways 210 is schematically depicted on the display 108 of the mobile device 200. In this embodiment, the plurality of gestural pathways 210 comprises one or more iterative arcs 240 extending circumferentially along the display 108 between a plurality of clock face directions. The iterative arcs 240 comprise a starting point 242 corresponding with a starting clock face position, a termination point 244 corresponding with a terminating clock face position, and one or more intermediate points 246 corresponding with one or more intermediate clock face positions on the display 108. The intermediate points 246 are positioned between the starting point 242 and the termination point 244 and may correspond to locations along the iterative arc 240 where the motion of the gestural input pauses, for example, for 0.5 sec, 1 sec, 2 sec, or the like. In operation, the environmental feedback system 100 may acquire and provide information regarding each points of interest 310 along clock face directions corresponding to the starting point 242, the termination point 244, and each intermediate point 246. For example, an individual iterative arc 240 may comprise a starting point 242 corresponding to the 9-o'clock direction, an intermediate point 246 corresponding to the 12 o-clock direction, and a termination point 244 corresponding to the 3-o-clock direction. In this embodiment, the environmental feedback system 100 may acquire information regarding points of interests 310 located in each of those clock face directions (3 o'clock, 12 o'clock, and 9 o'clock) and provide feedback including information regarding those points of interest 310 (for example, as depicted in the environment 300 in FIG. 2, information regarding the elevator, the bank, and the coffee shop). Additionally, it should be understood that the iterative arc 240 may extend in the clockwise direction or in the counterclockwise direction.

Figure 6:
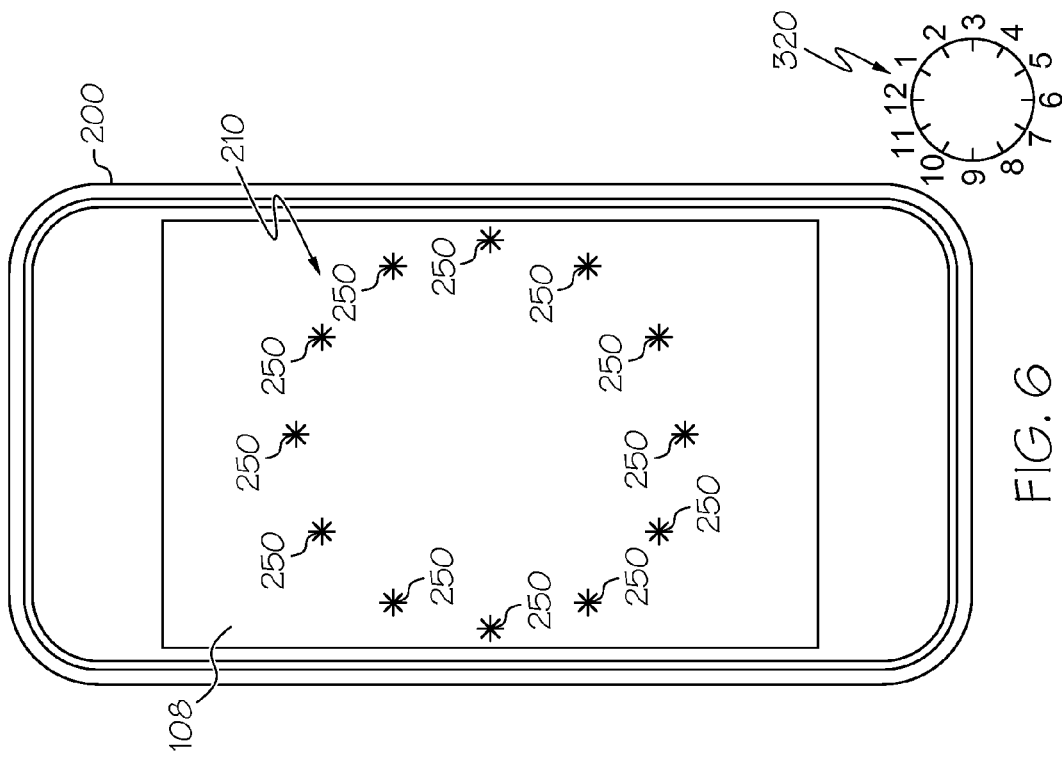
FIG. 6 schematically depicts the gestural pathways comprising tapping locations positioned on a mobile device, according to one or more embodiments shown and described herein.

Referring now to FIG. 6, another plurality of gestural pathways 210 are schematically depicted on the display 108 of the mobile device 200. In this embodiment, the plurality of gestural pathways 210 comprise one or more tapping locations 250. The tapping locations 250 may correspond to clock face positions on the display 108. In this embodiment, the gestural input comprises taps at the tapping locations 250. The taps may comprise a single tap or a plurality of taps, for example, a double tap. Gestural input comprising a tap at an individual clock face position may be a request for information regarding points of interest 310 positioned in the clock face direction corresponding with the clock face position of the tap.

Referring again to FIGS. 3-6, the environmental feedback system 100 may be configured such that multiple gestural inputs are receivable along an individual gestural pathway 210 and may correspond to various requests for environmental information. In some embodiments, a first gestural input may comprise a request for information regarding points of interest 310 located in the clock face direction corresponding with the first gestural input and a second, follow up gestural input may comprise an additional request for information regarding the points of interest 310. The follow up gestural input may correspond with a request for a particular type of information, such as navigational information or descriptive information. For example, a first gestural input along a ray 220 may correspond with a request for information, such as descriptive information, regarding a point of interest 310 in the clock face direction of the ray 220 and a second, follow up gestural input along the ray 220 may correspond with a request for different information with respect to the point of interest 310, such as navigational information. Additionally, the first gestural input may be a request for a first level of informational detail, for example, the presence of the point of interest 310 and the second, follow up gestural input may be a request for a second level of informational detail, for example, hours of operation, items for sale, or the like. The follow-up gestural inputs may be any number of gestural inputs, for example, three, four, or more gestural inputs. Further, it should be understood that multiple gestural inputs may be received along any of the gestural pathways 210 described herein, such as additional taps at tapping locations 250, additional swipes along sweeping pathways 230, or the like.

Referring again to FIGS. 3-6, the environmental feedback system 100 may be configured such that a combination of gestural inputs are receivable along different gestural pathways 210 and these gestural inputs may correspond to various requests for environmental information. For example, in one non-limiting example, a first gestural input may comprise a ray 220 along a particular clock face direction followed by a second gestural input of a tap at a tapping location 250 substantially co-located with the end of the ray 220. In this embodiment, the ray 220 may be a request for a first level of detail and the tap may be a follow-up request for a second level of detail. Also, in this embodiment, the gestural input along the ray 220 may be a request for one type of information, such as descriptive information, and the gestural input at the tapping location 250 may be a request for a second type of information, such as navigation information. It should be understood that the environmental feedback system 100 may be configured to receive any combination of gestural inputs along gestural pathways 210. Further, it should be understood that the gestural inputs described above are merely a non-exhaustive list of gestural inputs and gestural pathways 210. Any exemplary gestural input received along any exemplary gestural pathway 210 is contemplated, for example, multidirectional inputs, such as scrubbing, or the like, and multifinger inputs, such as pinching, or the like.

As stated above, the environmental feedback system 100 provides feedback regarding the one or more points of interest 310 in response to the received gestural input, for example, audible, tactile, visual, and/or haptic feedback regarding one or more points of interest 310. In response to the received gestural input, the environmental feedback system 100 may provide audible feedback using the one or more auditory devices 120 of the mobile device 200 and/or the auxiliary sensing apparatus 140. The audible feedback corresponds with the received gestural input and may comprise particular information about the point of interest, for example, descriptive and/or navigational information regarding the point of interest 310. The content of the audible feedback may correspond with the request received via gestural input on the display 108 of the mobile device 200. Further, it should be understood that the content of the feedback may be dependent on the mode of the environmental feedback system 100, as described below.

As a non-limiting example, in the environment 300 depicted in FIG. 2, a gestural input along the ray 220 (FIG. 3) in the 12 o'clock direction on the display 108 of the mobile device 200 may cause the environmental feedback system 100 to provide environmental feedback regarding the bank positioned in the 12 o'clock direction, for example, vocal feedback stating, for example, "there is a bank directly in front of you," "there is a bank in the 12 o'clock direction," or "the bank directly in front of you is a CHASE™ bank and is open from 9:00 AM to 5:00 PM." Additionally, in some embodiments, the environmental feedback system 100 may provide tactile and/or haptic feedback regarding the environment 300, for example, using one or more tactile feedback devices 126 embedded within and/or positioned on the auxiliary sensing apparatus 140 and/or the mobile device 200. The tactile and/or haptic feedback may comprise vibrations, pressure, puffs of air, or the like. The tactile feedback may be indicative of navigational and/or descriptive information regarding the point of interest 310. Further, in alternative embodiments, for example, embodiments configured for a non-visually impaired user 170, the feedback may include visual information regarding the environment 300 presented on the display 108 of the mobile device 200.

In some embodiments, the environmental feedback system 100 may be implemented by a computer program product such as a mobile device application. For example, the mobile device application may be selectable by the user 170 on the display 108 of the mobile device 200. By selecting the mobile device application, the display 108 of the mobile device 200 displays an interface which provides a location for gestural input receivable by the mobile device 200, for example, tactile input along one or more gestural pathways 210.

Further, in some embodiments, the environmental feedback system 100 may be placed in one or more modes, for example, using the mobile device application. The modes may include a navigation mode, a descriptive mode, or the like. When the environmental feedback system 100 is placed in the navigation mode, the information provided by the environmental feedback system 100 comprises navigational information with respect to the one or more points of interest 310, for example, the location of the point of interest and/or directions to the one or more points of interest 310, e.g., step-by-step directions, or the like. When the environmental feedback system 100 is placed in the descriptive mode, the environmental information provided by the environmental feedback system 100 comprises descriptive information, such as, for example, the presence of the points of interest 310, and additional detail regarding the points of interest 310, for example, the hours of operation of the points of interest 310, items and services offered at the points of interest 310, or the like.

It should be understood that embodiments described herein provide for systems and methods for providing feedback to a user, for example, a blind user, regarding one or more points of interests located in an environment surrounding the user based on a received tactile input. The systems and methods allow the user to request information regarding points of interest positioned in a particular clock face direction with respect to the components of the environmental feedback system and/or the user by inputting gestural input into tactile input hardware of a mobile device. Further, the systems and methods allow the user to request varying levels of detail regarding the points of interest positioned in the surrounding environment by inputting particular types and combinations of gestural input. Further, the systems and methods provide feedback to the user regarding the points of interest in the surrounding environment based on the received gestural input.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for providing environmental feedback, the system comprising:
    one or more processors;
    a tactile input hardware, wherein the tactile input hardware is communicatively coupled to the one or more processors;
    one or more memory modules communicatively coupled to the one or more processors;
    one or more sensing devices communicatively coupled to the one or more processors; and
    machine readable instructions stored in the one or more memory modules that, when executed by the one or more processors, causes the one or more processors to:
        receive environmental information from the one or more sensing devices;
        receive a gestural input along a gestural pathway on the tactile input hardware corresponding with a clock face direction; and
        generate feedback regarding a subset of the environmental information acquired by the one or more sensing devices and corresponding with the clock face direction in response to the gestural input received on the tactile input hardware.

2. The system of claim 1, wherein the tactile input hardware is provided within a mobile device communicatively coupled to the one or more processors, the mobile device comprising one of a smartphone, a tablet, a laptop, or a watch and the tactile input hardware comprising a touchscreen display.

3. The system of claim 1, wherein the one or more sensing devices are positioned on a wearable auxiliary sensing apparatus.

4. The system of claim 1, wherein the one or more sensing devices comprise at least one of a proximity sensor and a camera.

5. The system of claim 1 further comprising an auditory device communicatively coupled to the one or more processors, wherein the feedback is an auditory message provided though the auditory device.

6. The system of claim 1, wherein the feedback regarding the subset of environmental information provided in response to the received gestural input comprises environmental information regarding one or more points of interest within an environment positioned in the clock face direction corresponding to the gestural pathway of the received gestural input.

7. The system of claim 1, wherein the gestural pathway comprises one or more rays extending radially from a central portion of the tactile input hardware, and the provided feedback comprises environmental information regarding one or more points of interest within an environment positioned in the clock face direction corresponding to the one or more rays.

8. The system of claim 1, wherein:
    the gestural pathway comprises one or more sweeping pathways extending along an arc on the tactile input hardware from a starting point corresponding with a starting clock face position to a termination point corresponding to a terminating clock face position; and
    the provided feedback comprises environmental information regarding one or more points of interest within an environment positioned in one or more clock face positions between the starting clock face position and the terminating clock face position.

9. The system of claim 1, wherein:
    the gestural pathway comprises one or more iterative arcs extending along an arc on the tactile input hardware from a starting point corresponding to a starting clock face position to one or more intermediate points corresponding to one or more intermediate clock face positions, to a termination point corresponding to a terminating clock face position; and
    the provided feedback comprises sequential environmental information regarding one or more points of interest within an environment positioned in the starting clock face position, the one or more intermediate clock face positions, and the terminating clock face position.

10. The system of claim 1, wherein:
    the gestural input is a first gestural input received along a gestural pathway on the tactile input hardware corresponding with the clock face direction;
    the environmental information regards one or more points of interest disposed in the clock face direction of the first gestural input;
    the feedback is a first feedback regarding the one or more points of interest disposed in the clock face direction in response to the first gestural input, wherein the first feedback comprises a first level of detail; and
    the machine readable instructions stored in the one or more memory modules further cause the system to perform at least the following when executed by the one or more processors:
        receive a second gestural input on the tactile input hardware, wherein the second gestural input sequentially follows the first gestural input; and
        provide a second feedback regarding a second level of detail regarding the one or more points of interest disposed in the clock face direction in response to the second gestural input received on the tactile input hardware.

11. The system of claim 10, wherein the first feedback regarding the first level of detail comprises descriptive information regarding the one or more points of interest and the second feedback regarding the second level of detail comprises navigational information regarding the one or more points of interest.

12. The system of claim 10, wherein the first feedback regarding the first level of detail includes information regarding a presence of the one or more points of interest.

13. A system for providing environmental feedback, the system comprising:
a mobile device comprising tactile input hardware; and
an auxiliary sensing apparatus comprising one or more sensing devices, wherein:
the mobile device is configured to receive a gestural input on the tactile input hardware of the mobile device, the gestural input comprising a gestural pathway along a surface of the tactile input hardware and the gestural pathway corresponding with a clock face direction;
the wearable auxiliary sensing apparatus is configured to receive environmental information regarding one or more points of interest within an environment disposed in the clock face direction of the gestural pathway; and
at least one of the wearable auxiliary sensing apparatus and the mobile device are configured to provide feedback regarding the one or more points of interest within the environment disposed in the clock face direction of the gestural pathway in response to the gestural input received on the tactile input hardware of the mobile device.

14. The system of claim 13, wherein the mobile device comprises one of a smartphone, a tablet, a laptop, or a watch and the tactile input hardware comprises a touchscreen display of the mobile device.

15. The system of claim 13, wherein the one or more sensing devices comprises at least one of a proximity sensor and a camera.

16. The system of claim 13, wherein the feedback is an audible feedback.

17. The system of claim 13, wherein:
the gestural input is a first gestural input received along the gestural pathway on the tactile input hardware corresponding with the clock face direction;
the feedback is a first feedback regarding the one or more points of interest disposed in the clock face direction in response to the first gestural input, wherein the first feedback comprises a first level of detail;
the mobile device is further configured to receive a second gestural input on the tactile input hardware of the mobile device, wherein the second gestural input sequentially follows the first gestural input; and
at least one of the wearable auxiliary sensing apparatus and the mobile device are further configured provide a second feedback regarding a second level of detail regarding the one or more points of interest disposed in the clock face direction in response to the second gestural input received on the tactile input hardware of the mobile device.

18. The system of claim 17, wherein the first feedback regarding the first level of detail comprises descriptive information regarding the one or more points of interest and the second feedback regarding the second level of detail comprises navigational information regarding the one or more points of interest.

19. The system of claim 17, wherein the first feedback regarding the first level of detail includes information regarding a presence of the one or more points of interest.

\* \* \* \* \*